(12) United States Patent
Mishra et al.

(10) Patent No.: US 8,639,591 B1
(45) Date of Patent: Jan. 28, 2014

(54) SYSTEM AND METHOD FOR GENERATING A VISUAL DISPLAY INDICATING THE STATUS OF MULTIPLE SHIPPING LOADS

(75) Inventors: Devesh Mishra, Issaquah, WA (US); Eric Young, Mercer Island, WA (US); Michael McKenna, Bellevue, WA (US); Jun Zhao, Bellevue, WA (US); Kevin R. MacKenzie, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 934 days.

(21) Appl. No.: 12/242,482

(22) Filed: Sep. 30, 2008

(51) Int. Cl.
*G06Q 10/00* (2012.01)

(52) U.S. Cl.
USPC .......................................................... 705/28

(58) Field of Classification Search
None
See application file for complete search history.

(56) References Cited

U.S. PATENT DOCUMENTS

| | | | |
|---|---|---|---|
| 6,148,291 A * | 11/2000 | Radican | 705/28 |
| 6,611,755 B1 | 8/2003 | Coffee et al. | |
| 6,789,011 B2 | 9/2004 | Baiada et al. | |
| 6,819,236 B2 | 11/2004 | Kawai et al. | |
| 6,898,476 B2 * | 5/2005 | Watanabe et al. | 700/108 |
| 2004/0193502 A1 * | 9/2004 | Heitner et al. | 705/26 |

* cited by examiner

*Primary Examiner* — Paul Danneman
(74) *Attorney, Agent, or Firm* — Robert C. Kowert; Meyertons, Hood, Kivlin, Kowert & Goetzel, P.C.

(57) ABSTRACT

Various embodiments of a system and method for generating a visual display indicating the status of multiple shipping loads are described. The embodiments described herein may include one or more displays and a display control component configured to control the displays. In various embodiments, the display control component may track items (e.g., freight, inventory, etc.) shipped to a materials handling facility and generate a display to visually indicate the various statuses as a graphical representation. As described in more detail herein, such a display may provide agents with greater visibility into the various processes performed in the materials handling facility. To do so, the various displays under the control of the display control component may in some embodiments be strategically located within the materials handling facility. For instance, such displays may be present in inbound and outbound docking areas in the presence of one or more agents.

39 Claims, 7 Drawing Sheets

| | A | B | C | D | E | F | G | H | J | K | |
|---|---|---|---|---|---|---|---|---|---|---|---|
| | Scheduled | Actual | Carrier | Door | Load Status | Product Groups | # Units in Load | # Units Received | # Units Stowed | Time Left | |
| 1 | 7:30 AM | 7:45 AM | ACME | 1 | Stowing | Apparel | 7,000 | 7,000 | 2,500 | 0:30 | |
| 2 | 9:00 AM | 9:00 AM | ABC | 1 | Receiving | Books, Music, Video | 11,138 | 11,138 | 3,000 | 2:29 | |
| 3 | 10:00 AM | 10:00 AM | XYZ | 3 | Receiving | Apparel, Furniture | 8000 | -- | -- | 3:29 | |
| 4 | 10:00 AM | 10:30 AM | JKL | 2 | Checking In | Toys | 962 | -- | -- | -- | |
| 5 | 10:15 AM | 10:30 AM | ACME | 5 | Checking In | Books, Music, Video | 15,000 | -- | -- | 3:29 | |
| 6 | 11:00 AM | Pending | ACME | 1 | Arriving | Electronics | 320 | -- | -- | -- | |
| 7 | 11:00 AM | Pending | XYZ | 4 | Arriving | Books | 2,150 | -- | -- | -- | |

Graphical representation 395

Status display 390

*Figure 4*

SYSTEM AND METHOD FOR GENERATING A VISUAL DISPLAY INDICATING THE STATUS OF MULTIPLE SHIPPING LOADS

BACKGROUND

In a distribution system, a retailer or other product distributor (which may collectively be referred to as distributors) typically maintains an inventory of various items at one or more distribution centers, fulfillment centers, cross-docking facilities, materials handling facilities or warehouses (which may collectively be referred to herein as fulfillment centers). The inventory items are ordered from one or more vendors, received at the materials handling facilities as inbound shipments, and stocked in inventory of the materials handling facilities. In an order fulfillment process, orders for items may be received from customers of the distributor. Units of the ordered items are picked from various locations in the inventory in the materials handling facilities, processed for shipping, and shipped as outbound shipments to the customers.

The order fulfillment process may include a sortation process, in which units of items picked for orders are sorted into their respective orders. For example, requests (e.g., orders) for units of items from requestors may be divided among multiple agents, who then pick units corresponding to the requests. The orders may be subdivided among the agents; therefore, two or more of the agents may pick units for one order. Consequently, a sort operation to select the proper units of items for given orders from the aggregations of units returned by each respective agent is required. Conventionally, sorting may be performed using automated sorting mechanisms or manual sorting systems. Automated sorting mechanisms for sorting certain types of inventory units according to individual orders include, but are not limited to, the Crisplant® sorter, Eurosort® sorters, and automated sorting mechanisms offered by other vendors. Using an automated sorting mechanism, incoming picked units of items for multiple different customer orders are received at the automated sorting mechanism and sorted by the automated mechanism according to individual shipments. Once items are sorted into respective shipments, each shipment can be packaged and shipped to respective customers.

Managing Inbound and Outbound Shipments

In many fulfillment centers, inbound and outbound shipments are largely managed by a labor force of multiple agents. For inbound items to be stored in the fulfillment center, agents may manually unload items from incoming shipments. There are usually multiple (in some cases many) inbound shipments during a typical workday for a given fulfillment center. To manage labor resources at the inbound dock, agents (and/or managers) primarily consider conditions on the inbound dock to determine how and where to allocate labor resources. In a similar fashion, to manage labor resources at the outbound dock, agents (and/or managers) primarily consider conditions on the outbound dock. In some cases, conditions outside of the dock can affect the effectiveness of labor utilization in the fulfillment center.

BRIEF DESCRIPTION OF THE DRAWINGS

FIG. 4 illustrates an example of a graphical representation illustrating various states of shipping loads.

Figure 1:
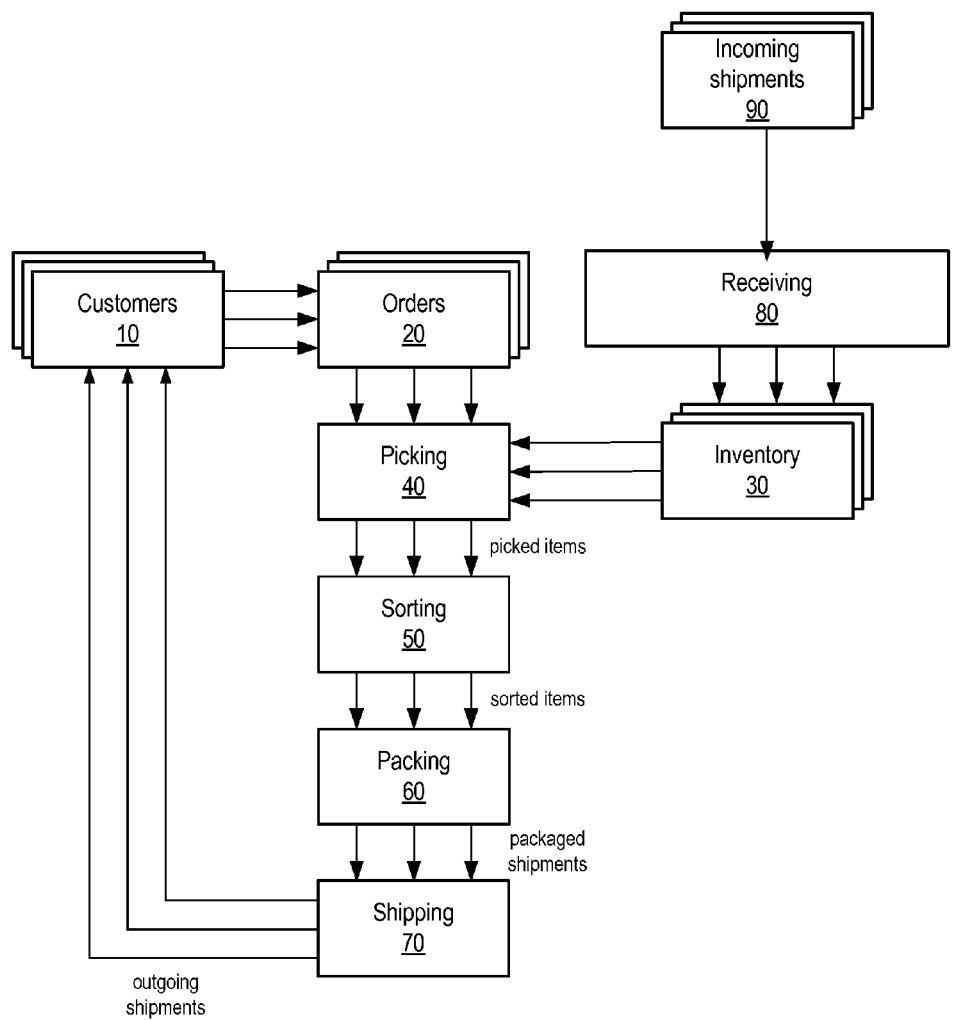
FIG. 1 illustrates a logical representation or view of the operation of a materials handling facility in which embodiments of the system and method for generating a visual display indicating the status of multiple shipping loads may be implemented.

While various embodiments are described herein by way of example for several embodiments and illustrative drawings, those skilled in the art will recognize that various embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope of various embodiments as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a system and method for generating a visual display indicating the status of multiple shipping loads are described. The embodiments described herein may include one or more displays and a display control component configured to control the displays. In various embodiments, the display control component may track items (e.g., freight, inventory, etc.) shipped to a materials handling facility and generate one or more displays to indicate the various statuses of such items. As described in more detail herein, such a display may provide agents with greater visibility into the various processes performed in the materials handling facility.

In various embodiments, the items en route to the materials handling facility may include items shipped to the materials handling facility in response to one or more purchase orders. For example, such materials handling facility may store inventory items used to fulfill orders for various customers, such as customers that purchase the items through an e-commerce website or some other commercial venue. As inventory (also referred to as stock storage in some cases) is depleted from the materials handling facility, the materials handling facility may submit one or more purchase orders to vendors in order to replenish the inventory within the materials handling facility.

For each load of items sent to the materials handling facility, the display control component may determine (either directly or through the use of other monitoring components) the status of a load arrival process. Generally speaking, the load arrival process may include any of the various possible states in which a load may reside while being transported to the materials handling facility. According to some of the various states of the load arrival process, an incoming load may be en route to the materials handling facility or may have arrived at the materials handling facility. In other cases, an inbound load may have arrived at the premises on which the materials handling facility is located but not yet arrived at the actual fulfillment center. Various other states of a load arrival process are described in more detail herein. Also note that, as used herein, the terms "inbound," "incoming," "outbound" and "outgoing" are used with respect to the materials handling facility.

In various embodiments, the display control component may also determine the status of one or more inventory receiving processes (or simply a "receiving process") for each incoming load. For instance, in one embodiment, an inventory receiving process may include multiple phases including but not limited to unloading items from a vehicle, placing such items in a buffer or storage zone prior to stowage, preparing such items to be stowed, and stowing such items as inventory within the materials handling facility. The display control component described herein may be configured to generate a graphical representation (or simply "display") of any of the above described information (e.g., status of a load arrival process, status of an inventory receiving process, etc.) for various inbound loads. In some embodiments, such graphical representation may be presented on a display screen, such as a display screen viewable to agents or workers within the materials handling facility. In various embodiments, the graphical representation described herein may be generated on one or more displays placed within the materials handling facility and visible from one or more docking bays. As described in more detail herein, the graphical representation generated by the display control component may provide agents (e.g., agent stationed at such docking bays) with detailed visibility into the status of incoming loads to be stored as inventory.

While the description herein is largely presented with respect to inbound shipments transported to a materials handling facility, the systems and methods described can also be applied in a variety of ways to outbound items, such as shipments to customers or transshipments sent to other materials handling facilities. For example, in some cases, the materials handling facilities described herein may be one of many materials handling facilities in a vast network of strategically located materials handling facilities throughout a particular region (e.g., throughout a particular state, country or even worldwide). Since inventory levels can fluctuate at any given one of such materials handling facilities, a materials handling facility (such as one with low levels of inventory of a particular item) may request items from another materials handling facility (such as one with higher levels of inventory for the particular item). Such materials handling facility transshipments can be particularly useful when vendors momentarily cannot meet the transient demands of the marketplace.

Overview of the Materials Handling Facility

FIG. 1 illustrates a logical representation or view of the operation of a materials handling facility in which various embodiments may be implemented. For example, this Figure may illustrate a materials handling facility of a product distributor or e-commerce enterprise. Multiple customers 10 may submit orders 20 to the product distributor, where each order 20 specifies one or more items from inventory 30 to be shipped to the customer that submitted the order. To fulfill the customer orders 20, the one or more items specified in each order may be retrieved, or picked, from inventory 30 (which may also be referred to as stock storage) in the materials handling facility, as indicated at 40. Picked items may be delivered or conveyed, if necessary, to one or more stations in the materials handling facility for sorting 50 into their respective orders, packing 60, and finally shipping 70 to the customers 10. In various embodiments, picked items may be delivered to an induction station, where the items are inducted into a sorting system (e.g., a sorting mechanism, sorting process, or some combination thereof). The items may then be routed to particular destinations in accordance with the requests (orders) currently being processed, e.g. to sorting stations, under direction of the control system. Various sorting mechanisms and processes (which may be represented by sorting 50) are described in more detail below. A picked, packed and shipped order does not necessarily include all of the items ordered by the customer; an outgoing shipment to a customer may include only a subset of the ordered items available to ship at one time from one inventory-storing location. In other cases, items of the order may be split into multiple shipments for a variety of reasons including but not limited to space and/or economic efficiency. For instance, shipping a set of items in three small shipments may be less expensive than shipping the set of items in one large shipment.

A materials handling facility may also include a receiving 80 operation for receiving shipments of stock from one or more sources (e.g., vendors) and for placing the received stock into stock storage. The receiving 80 operation may also receive and process returned purchased or rented items or orders from customers. At least some of these items are typically returned to inventory 30. The various operations of a materials handling facility may be located in one building or facility, or alternatively may be spread or subdivided across two or more buildings or facilities.

Figure 2:
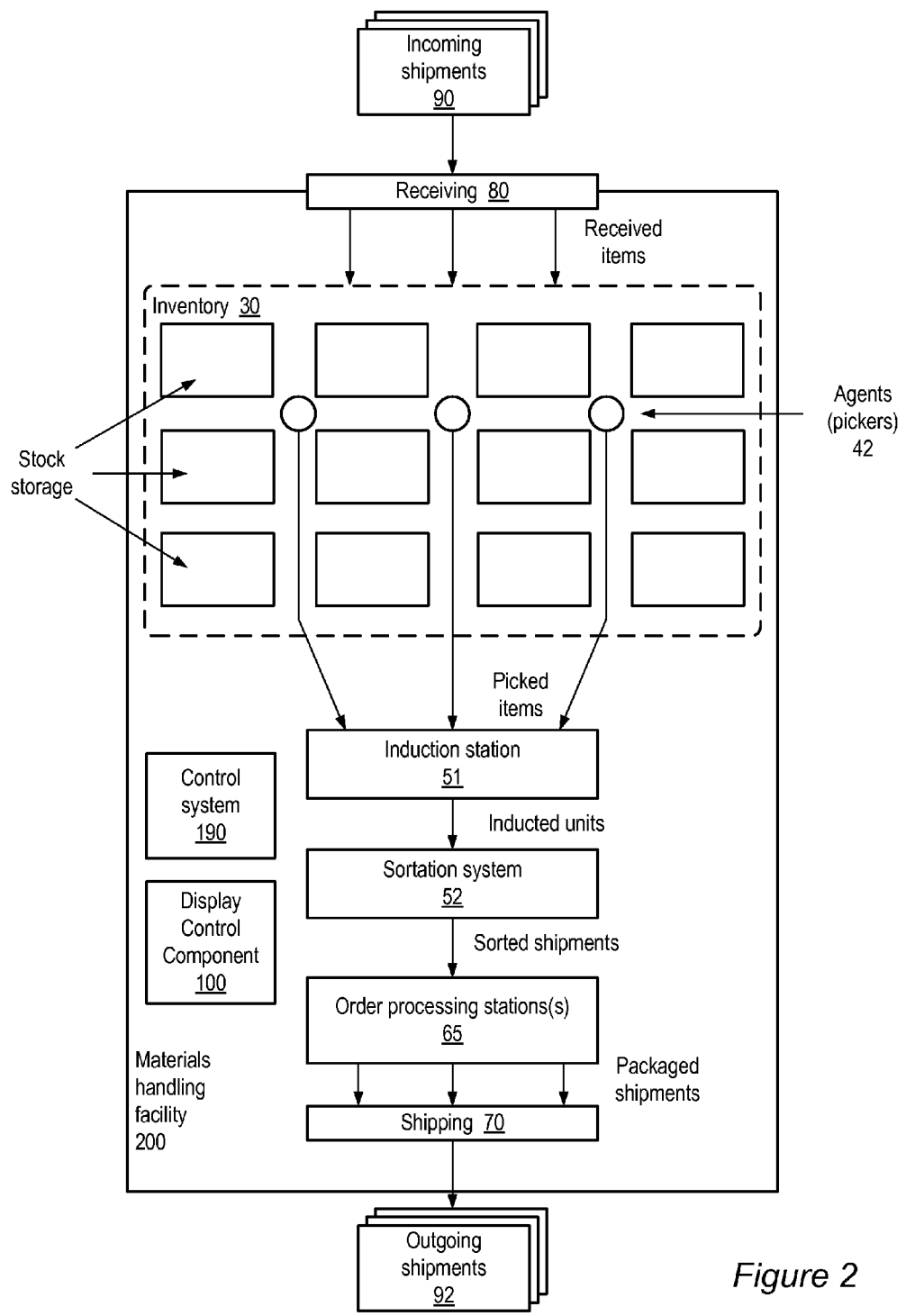
FIG. 2 illustrates one embodiment of the physical layout of a materials handling facility.

FIG. 2 illustrates an example of a physical layout of a materials handling facility, such as an order fulfillment facility or center, in which embodiments of the control system may be implemented. At any one time, one or more agents 42 of the distributor may each be picking items from inventory 30 to fulfill portions or all of one or more requests or orders. This may result in multiple items (e.g., a stream of items and/or batches of picked items) for multiple incomplete or complete orders, which may then be delivered to an induction station 51 for sortation system 52, which may include sorting mechanisms and/or sorting processes for sorting items into respective shipments of items. For example, in some embodiments, the induction point may refer to a station where items may be inducted into a conveyance mechanism for conveying items to sorting stations configured for sorting items into respective shipments. In another example, the induction point may refer to a station where items may be inducted into a conveyance mechanism of an automated sorter (e.g., a Crisplant® sorter).

In some embodiments, the conveyance mechanism (under direction of the control system) may then deliver the items to various order processing stations 65, which may include one or more packing stations, in the materials handling facility for processing prior to shipping 70. Portions of an order may be received from the pickers 42, or from other stations, at a processing station 65 at different times, so processing at a station may have to wait for one or more items for some orders to be delivered to the station from picking and/or from another station before completion of processing of the orders at the station. The picked items of items delivered to a processing station via a conveyance mechanism may be processed at a processing station 55, for example sorted into their respective orders at a sorting station under direction of the control system. Once the processing of items for an order is completed at a station, the items may be delivered to another station for further processing, for example to a sorting station to be sorted into orders, or to a packing station to be packaged for shipping 70.

A materials handling facility may also include one or more receiving 80 operations for receiving shipments 90 of stock from various vendors. The received stock may then be placed into stock storage. The receiving 80 operation may also receive and process returned, purchased, or rented items from customers. The various operations and stations of a materials handling facility may be located in one building or facility, or alternatively may be spread or subdivided across two or more buildings or facilities.

In various embodiments, control system 190 may generate and/or maintain a stored indication of the state of each item within the materials handling facility (e.g., each item might have its own record in a database of the control system). For example, such a stored indication may indicate, for each of one or more of the items within the materials handling facility, the location of the item (e.g., storage, induction station, sortation system, order processing station, etc.) and/or the fulfillment process that the item is currently undergoing (e.g., induction, sorting, packing, shipping, etc.). In various embodiments, the illustrated display control component 100 described herein may be configured to communicate with the control system to determine the status or location of various items throughout the materials handling facility.

The Display Control Component and Generated Status Displays

Figure 3:
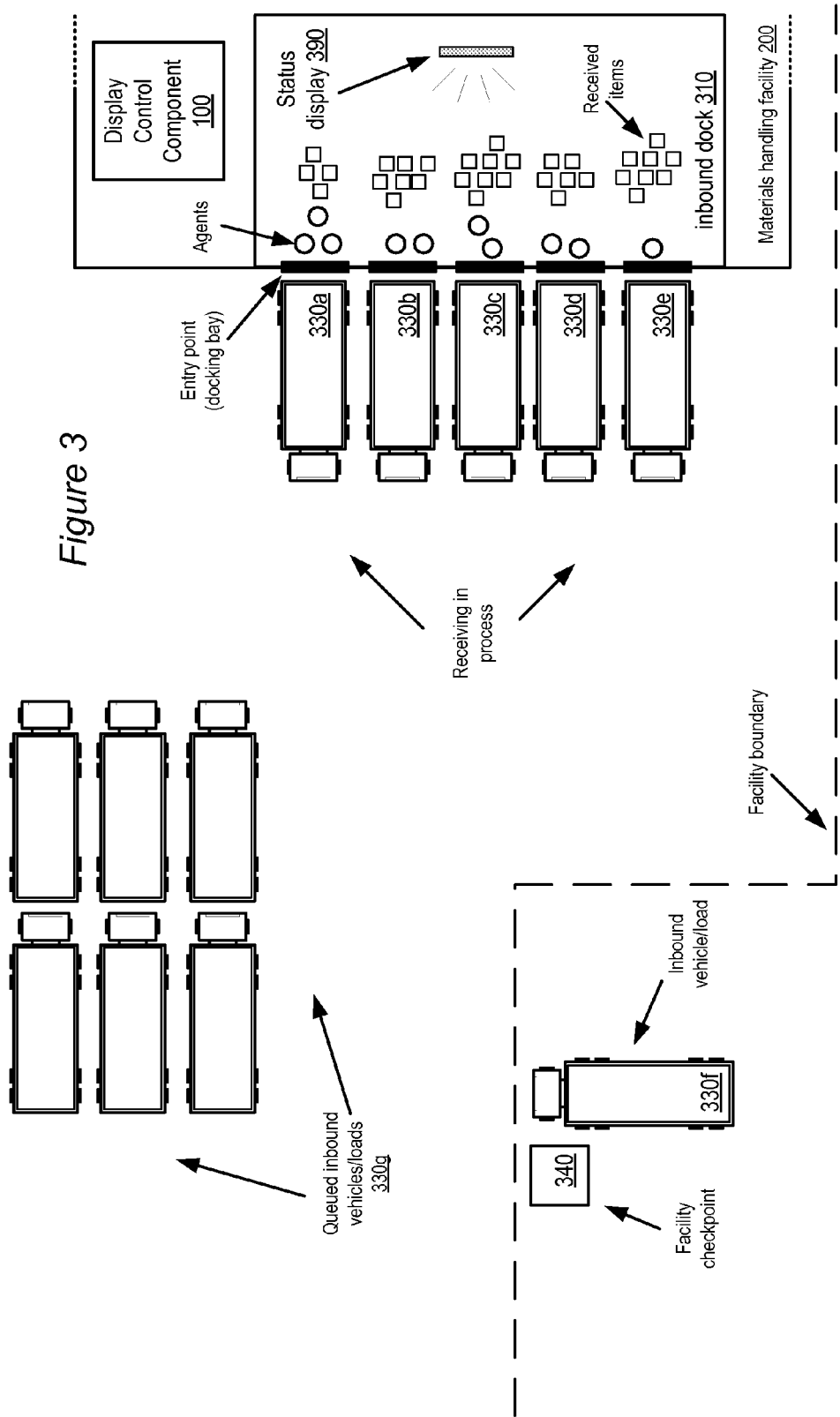
FIG. 3 illustrates the flow of vehicles and shipments during the receipt of shipments at a materials handling facility.

As described above, in various embodiments, the display control component may track items (e.g., freight, inventory, etc.) shipped to a materials handling facility and generate a display to visually indicate the various statuses, such as to indicate such statuses to personnel at the materials handling facility. Such a display may provide agents with greater visibility into the various processes performed in the materials handling facility as well as prevent processing delays associated with the arrival of loads to the materials handling facility and/or the processing of loads at the materials handling facility. FIG. 3 illustrates a physical representation of the premises of a materials handling facility (denoted by the dashed "facility boundary" line). Note that the illustrated embodiment is not necessarily drawn to scale. Also note that in various embodiments the position and/or orientation of the various elements may be different than that illustrated by FIG. 3.

In the illustrated embodiment, each of multiple vehicles is illustrated in various states of a load arrival process for transporting a respective load of one or more items to materials handling facility 200. Each of the illustrated vehicles 330 (e.g., vehicles 330a-g) carries or transports a load of one or more items to the materials handling facility. According to various states of a load arrival process, an incoming load may be en route to the materials handling facility or may have already arrived at the materials handling facility. In other cases, an inbound load may have arrived at the premises on which the materials handling facility is located (e.g., as denoted by the dashed "facility boundary" line) but not yet arrived at the actual fulfillment center. For example, in the illustrated embodiment, inbound vehicle 330f has arrived at the premises on which the order fulfillment is located but has not arrived at the actual materials handling facility (e.g., materials handling facility 200). In some embodiments, a facility checkpoint 340, which may be staffed by one or more agents, may be utilized to record the arrival of a given inbound vehicle at the premises of the materials handling facility. For example, in one embodiment the facility checkpoint may record vehicle 330f's arrival at the premises of the materials handling facility by providing or assigning a token to the load carried by the vehicle, the vehicle itself, or the driver of the vehicle. In any of such cases, the load carried by vehicle 330f may be tracked by such token either directly (e.g., the location of the load is determined to be the location of the token) or indirectly (e.g., the location of the load is inferred from the location of the vehicle or driver). In various embodiments, such token may be a physical token (e.g., a security pass), an electronic token (e.g., a smart card or electronic ID card), or an abstract token (e.g., a security code spoken to the driver of the vehicle). In any of such cases, the token may be detected at various locations throughout the fulfillment center premises, and the location or state of the load can be determined or inferred from such locations at which the token is detected.

Note that in various embodiments, the location of a load, vehicle, or driver of the vehicle may be tracked using one or more positioning technologies. For example, in various embodiments, the Global Positioning System (GPS) may be used to track a load, such as a load en route to the materials handling facility. For example, the load or a container of the load (which may be the vehicle transporting the load) may be tagged with a GPS tag such that the load can be tracked with a 2-way GPS receiver, which may be integrated into the control system of the materials handling facility or into the display control component 100. In other embodiments, other positioning methods or technologies (e.g., cellular tower triangulation) may be utilized by control system 190 and/or display control component 100 in order to track the location of a load, whether such technologies and methods are presently known or developed in the future.

In some embodiments, an inbound load may be delayed in a queued state of a load arrival process. In one embodiment, the loads of queued vehicle 330g are delayed in a queued state of a load arrival process since each of such vehicles may be waiting on an entry point of the materials handling facility to become available. In other embodiments, inbound loads may be in other states of a load arrival process. For example, in one embodiment, a vehicle transporting an inbound load may be undergoing a safety preparation prior to docking at an entry point (e.g., a docking bay or dock door) of the materials handling facility. For example, in the case of a wheeled vehicle, such safety preparation may include obstructing the wheels (e.g., with a wedge or block) of the vehicle in order to ensure that the vehicle does not shift or roll during while docked.

Note that while the illustrated vehicles resemble a truck and trailer combination (in which case the trailer would carry the respective load), a variety of other types of vehicles may be utilized in various embodiments. For example, automobiles, cargo vehicles, airborne vehicles, railway vehicles, and any other mobile vehicle may be utilized in various embodiments. In some embodiments, a vehicle may be as simple as a container configured to hold one or more items. One example of such a vehicle may include an enclosed trailer which may be moved about by a separate conveyance mechanism, such as a truck. In cases where the vehicle itself is not mobile, the vehicle may be moved about by a separate conveyance system (e.g., a series of conveyors, lifts, etc.).

In various embodiments, the load arrival process described above concludes when a load arrives at an entry point of the materials handling facility, as illustrated by vehicles 330a-e docked at inbound dock 310. In many (but not necessarily all) embodiments, from the point at which a given load is shipped to the materials handling facility to the point at which the given load arrives at an entry point of the materials handling facility, the given load may travel as single, cohesive unit (e.g., within a truck trailer or other container). However, in many embodiments, when the load arrives at the entry point of the materials handling facility, the materials handling facility (e.g., the agents, mechanisms, or processes of the materials handling facility) may process disparate portions of the load differently. For instance, instead of handling the load as a single, cohesive group of items (as is the case in many embodiments during the transport of the load to the materials handling facility), the materials handling facility may process each of the items of the load as separate individual units. In other cases, the materials handling facility may process at least a portion of the load as separate groups of items. In some cases, such groups may be selected by an agent or by the control system of the materials handling facility. In other cases, such groups may be specified by the manner in which the load is stored in its respective vehicle. For example, in some cases, items of the load may be subdivided into groups of items on or in a respective platform (e.g., a pallet) or container (e.g., a crate).

As described above, the materials handling facility 200 may in some embodiments process arrived loads in multiple portions, the granularity of which may be as small as a single unit of an item. For each of such portions including one or more items, control system 190 and/or display control component 100 may be configured to determine a state of an inventory receiving process in which the one or more items reside. Generally speaking, such states may include any state of a given item as it travels from the entry point of the materials handling facility to its final stowage location in inventory (e.g., inventory 30) of the materials handling facility. For instance, in one embodiment, an inventory receiving process may include multiple phases or states including but not limited to unloading items from a vehicle, placing such items in a buffer or storage zone prior to stowage, preparing such items to be stowed, and stowing such items as inventory within the materials handling facility. In various embodiments, unloading items from the vehicle may include breaking down crates, pallets, or similar structures such that items can be handled in smaller groups or individually. In some embodiments, preparing items to be stowed may include unpacking and/or repacking various items into new containers or protective material (bubble wrap, etc.).

As described above, a load shipped to the materials handling facility may pass through phases or states of a load arrival process. For example, among other phases, an incoming load may be en route to the materials handling facility or may have arrived at the materials handling facility. In other cases, an inbound load may have arrived at the premises on which the materials handling facility is located but not yet arrived at the actual fulfillment center. Additionally, when processed at the materials handling facility, various portions of an arrived load may pass through various states of an inventory receiving process, as described above. In order to, among other things, provide visibility into the various states of loads en route to the materials handling facility and/or loads that have arrived at the materials handling facility, the display control component described herein may monitor (either directly or via other components, such as control system 190) one or more of such states and generate a graphical representation of such states on a display within (or proximate to) the materials handling facility, such as status display 390. Generally speaking, for each of one or more loads destined for or located at the materials handling facility, the graphical representation may indicate the status of the load arrival process for the item and/or the status of an inventory receiving process for one or more items of the load. Such graphical representation may in various embodiments include text, audio, video, and/or multimedia.

FIG. 4 illustrates one example of such a graphical representation, as illustrated by graphical representation 395. Note that the description herein may refer to various portions of graphical representation 395 by column letter and/or row number. For instance, each row may represent a respective load. Each column may represent a respective type of data for the load. In this description, a combination of row number and column letter may be used to refer to a particular cell of the graphical representation. Note that status display 390 may include any hardware device or system (e.g., a monitor, television, liquid crystal display, plasma display, light emitting diode display, etc.) configured to display a graphical representation, such as graphical representation 395. In the illustrated example, the generated graphical representation may include various types of data (denoted by columns A-F) for each of multiple loads.

In regard to columns A, the display control component described herein may be configured to display a time at which a given load is expected to arrive at the materials handling facility. However, as is sometimes the case, the actual arrival time of a given load may be different for a variety of reasons. For example, a vehicle carrying the given load could arrive late due to vehicle malfunctions (e.g., flat tire, etc.) or vendor scheduling issues. Accordingly, column B indicates an actual time at which the load arrived, such as the actual time that the vehicle carrying the load arrived. Note that in various embodiments, the scheduled time may represent a time at which the load is expected to arrive at the premises on which the materials handling facility is located or, alternatively, a time at which the load is expected to arrive at the actual materials handling facility. Similarly, in various embodiments, the actual time may represent a time at which the load arrived at the premises on which the materials handling facility is located or, alternatively, a time at which the load arrived at the actual materials handling facility. Note that in some cases, the boundary of the premises may be a substantial distance away from the materials handling facility (see e.g., FIG. 3). In various embodiments, providing such information to agents of the materials handling facility can improve the handling of incoming loads. For example, consider a case where the graphical display indicates that a load has arrived early. If an agent manning a particular entry point of the facility knows that the next load assigned to his entry point will be arriving early, the agent can increase his pace of unloading items currently at the dock or alternatively (or additionally) request additional labor resources to assist with the unloading items currently at the dock. In this way, the agent(s) may in some cases ensure that the dock is available for an early-arriving load.

In regard to column C, the display control component may be configured to display the carrier of the load, such as the commercial entity that owns or operates the vehicles that transports the given load to the materials handling facility. In various embodiments, knowledge of the carrier may assist agents with the receipt of a particular load. For example, some carriers exhibit certain load packing characteristics. For example, one carrier might typically load items onto pallets that are then placed in the transport vehicle. Another carrier might load all items on the floor of a transport vehicle. If an agent has such knowledge, he can make strategic decisions as to which equipment to prepare for the arrival of a load. For example, a load of items on pallets might require the use of a forklift or other machinery to remove the load from the vehicle in which it is transported. In another example, a load of items placed directly on the floor of the transport vehicle might require a hand truck and/or additional labor resources since heavy machinery (e.g., a forklift) may be ineffective or inefficient for such loads. In other embodiments, instead of (or in addition to) a carrier designation for each load, the graphical representation may specify one or more unloading requirements for unloading one or more items of the given load from the respective vehicle transporting said load. In one embodiment, at least one of such unloading requirements specifies particular equipment with which to unload one or more items of the given load, such as a forklift, hand truck, or some other tool or machinery.

In regard to column D, the display control component may be configured to display the entry point (e.g., a docking bay, door or other opening) of the materials handling facility for a given load. In various embodiments, the entry point of the materials handling facility is assigned to the load by the control system. In other cases, the control system may detect that a vehicle driver has chosen to deliver a load to a particular entry point. In either case, the display control component may access such information from the control system and include it as part of graphical representation 395. By displaying the particular entry point as part of the graphical representation, an agent (e.g., an agent assigned to man a particular entry point) can quickly determine which loads are scheduled to arrive at his entry point as well as the status of the load currently being processed at his assigned entry point (discussed in more detail below with respect to columns G-K).

In regard to column E, for any given load of the graphical representation (e.g., any one of rows 1-7), the graphical representation may be configured to display (i.e., visually indicate) the state of a load arrival process of the load and/or the state of an inventory receiving process, each of which are described above. For instance, according to some of the various states of the load arrival process, an incoming load may be en route to the materials handling facility or may have arrived at the materials handling facility. In other cases, an inbound load may have arrived at the premises on which the materials handling facility is located but not yet arrived at the actual fulfillment center. Additionally, an inventory receiving process may include multiple phases including but not limited to unloading items from a vehicle, placing such items in a buffer or storage zone prior to stowage, preparing such items to be stowed, and stowing such items as inventory within the materials handling facility. In the illustrated embodiment, the label "Arriving" is utilized to indicate that a load of items is en route to the premises on which the materials handling facility is located. The label "Checking In" is utilized to indicate that the load has arrived at the premises on which the materials handling facility is located. As can be readily seen in light of the above description, the load statuses for the loads of rows 4-7 correspond to the status of a load arrival process. As illustrated in rows 2-3, the "Receiving label" is utilized to indicate that the respective load is currently being unloaded (and in some cases documented, such as to reconcile the receipt of items against purchase orders) at the entry point (e.g., a docking bay or dock door) of the materials handling facility. In row 1, the label "Stowing" is utilized to indicate that at least some of the items of the load have been stowed as inventory in the materials handling facility. By displaying the above described statuses, the graphical representation may present agents with a holistic view of real-time operations at the inbound (un) loading dock.

In regard to column F, for each given load, the graphical representation may be configured to visually indicate one or more product groups to which one or more items of the given load belong. Similar to the carrier column (column C), knowledge of the product groups may assist agents with the receipt of a particular load. For example, some product groups may exhibit certain load packing characteristics. For example, items of one product group might typically arrive on pallets (e.g., a big screen television). Items of another product group might typically be transported on the floor of a transport vehicle (e.g., various books or other small items). If an agent has such knowledge, he can make strategic decisions as to which equipment to prepare for the arrival of a given load. For example, a load of items on pallets might require the use of a forklift or other machinery to remove the load from the vehicle in which it is transported. In another example, a load of items placed directly on the floor of the transport vehicle might require a hand truck and/or additional labor resources since heavy machinery (e.g., a forklift) may be ineffective or inefficient for such loads.

In regard to column G, the graphical display may be configured to indicate the total number of units for a given load. Generally, the more units in a given load, the more labor resources required to efficiently process such load at the loading dock. By displaying an accurate number items of a given load, the graphical representation 395 may assist agents in determining the appropriate labor resources to dedicate to a particular load as well as anticipate appropriate labor resources for loads that have not yet arrived at the materials handling facility.

In regard to columns H and J, for at least some of the loads (although not necessarily all), graphical representation 395 may be configured to display information that provides a finer level of detail with respect to the inventory receiving process described above. For instance, since disparate ones of the items of a given load may be in different states of the inventory receiving process at any given moment, the graphical representation described herein may be configured to display the specific number of items in various stages of the inventory receiving process. For example, for the loads of rows 1 and 2, the graphical representation indicates both a number of units that have been received at the inbound dock (e.g., column H) as well as a number of units that have been stowed as inventory in the materials handling facility. By displaying a number of items that have been processed according to multiple states of the inventory receiving process, the graphic representation may provide agents with a finer level of visibility into the status of a given load.

In regard to column K, for at least some of the loads, graphical representation 395 may be configured to indicate an amount of time remaining to complete one or more states of the inventory receive process within a designated time period. For instance, in one embodiment the values of column K may represent an amount of time left until a time at which all items of said load are scheduled to be stowed (or, alternatively, received at the dock). In one particular example, the materials handling facility may operate under a requirement that specifies all inbound inventory must be ready to be purchased (e.g., stowed inventory available to fulfill customer orders) no later than a specified amount of time (e.g., 4 hours) after the load arrives at the premises.

In various embodiments, the various data that populates the graphical representation may be collected by the display control component described herein. In some cases, the display control component may collect such data directly. In other cases, the display control component may access some of such data from other components, such as control system 190. In some cases, such data (e.g., number of units in load, product groups represented by load, other characteristics of the load, etc.) may be provided by one or more Advanced Shipping Notifications (ASNs), such as notification adhering to various Electronic Data Interchange (EDI) standards (e.g., EDI 214).

In various embodiments, the graphic representation may include visual indicators to draw a viewer's attention to particular data or information. For example, cell B4 includes a visual indicator (e.g., a rectangle outlining the actual arrival time) to indicate that the particular load is running significantly behind schedule. In another example, cell K1 includes a visual indicator (e.g., a rectangle outlining the actual arrival time) to indicate that the time at which all items of the respective load are expected to be stowed is drawing near. Such indicators may be automatically generated by the display control component in response to the tripping of one or more thresholds.

Figure 5:
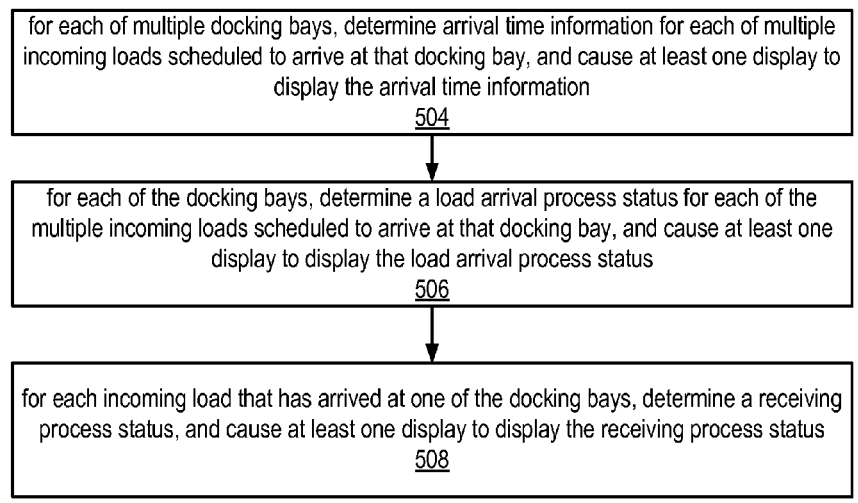
FIG. 5 illustrates a flowchart of an example method for generating a graphical representation for inbound shipping loads.

Various methods may be performed by the display control component described herein. One such method is illustrated by the flowchart of FIG. 5. As illustrated by block 504, the method may include, for each of multiple docking bays (e.g., the illustrated docking bays of FIG. 3), determining arrival time information for each of multiple incoming loads scheduled to arrive at that docking bay, and causing at least one display to display the arrival time information. For example, such arrival time information may include any of the information described above with respect to column A of FIG. 4, such as the information indicating the time and/or date of a scheduled arrival. In one embodiment, determining arrival time information may include querying such information from a vendor (e.g., a scheduled or expected arrival time for a given load of items). In other cases, determining arrival time information may include generating a prediction as to when a given load will arrive at the materials handling facility. For instance, as described above, various positioning technologies (e.g., GPS, triangulation, etc.) may be used to track a given load en route to the materials handling facilities. The determined arrival time information may then be displayed on one or more displays, such as status display 390 described above. For instance, the display control component or control system may send a corresponding instruction or other command to one or more displays in order to cause the displays to display such arrival time information. Note that while only one status display is illustrated in FIG. 3, multiple displays may be used in other embodiments. Additionally, the positioning and orientation of such display(s) may differ according to various embodiments.

As illustrated by block 506, the method may include, for each of the docking bays, determining a load arrival process status for each of the multiple incoming loads scheduled to arrive at that docking bay, and causing at least one display to display the load arrival process status. According to some of the various states of the load arrival process, an incoming load may be en route to the materials handling facility or may have arrived at the materials handling facility. In other cases, an inbound load may have arrived at the premises on which the materials handling facility is located but not yet arrived at the actual fulfillment center. The method may include visually indicating via one or more displays any of such states for the given load. In various embodiments, the method may include determining any of the load arrival process states described above, and display such states as the current load arrival process status for a given load. For instance, the display control component or control system may send a corresponding instruction or other command to one or more displays in order to cause the displays to display such load arrival process status. By viewing such information, agents (e.g., agents working various docking bays) may gain greater visibility into the status of loads assigned to various docking bays.

As illustrated by block 508, the method may further include, for each incoming load that has arrived at one of the docking bays, determining a receiving process status, and causing at least one display to display the receiving process status. One example of such a receiving process includes the inventory receiving process described above. For example, in one embodiment, an inventory receiving process may include multiple states including but not limited to unloading items from a vehicle, placing such items in a buffer or storage zone prior to stowage, preparing such items to be stowed, and stowing such items as inventory within the materials handling facility. Various other states or phases for a load arrival process and an inventory receiving process are described above. The method described herein may include visually displaying any of such states or phases for a given load.

As described above, the methods and display control component described above may generally apply to outbound loads (loads of shipments to customers or transshipments to other materials handling facilities) in manners similar to those described above with respect to inbound loads. One example of such an application is illustrated by the two-dimensional representation of an exit point (e.g., an outbound docking bay or dock door) of a materials handling facility. For simplicity, only one docking bay and one corresponding visual display (display 650) are illustrated. However, it should be understood that in many embodiments, an outbound dock of a materials handling facility may have multiple exit points (e.g., docking bays), and (in some cases) a corresponding one of visual display 650 for each exit point.

In the illustrated embodiment, a departure vehicle is currently being loaded with outgoing shipments 600. Such shipments may be shipments to one or more customers (e.g., customers that placed an order through an e-commerce portal) or one or more transshipments to other materials handling facilities. As is the case with inbound shipments, the graphical representation of visual display 650 may be generated by the display control component described herein. As illustrated, the graphical representation visually indicated a time remaining until the scheduled departure of the illustrated departure vehicle. The graphical representation also visually indicates the number of shipment remaining to be loaded onto the departure vehicle. By generating such information on a plurality of visual displays that are each placed proximate to a respective exit point, the display control component, in conjunction with the various visual displays, can provide a plurality of agents with accurate estimates of the amount of work that must be done to complete a given load. In some cases, such information of the display may assist with staffing one or more of the exit points. For example, if the visual display at a particular exit point visually indicates that there is a very large number of shipments to load in a very short period of time, one or more agents (or a supervisor) may request additional labor resource to ensure that the departure vehicle is able to depart in a timely manner. It should be understood that in alternative embodiments one or more of such graphical representations could be consolidated onto the same visual display.

In various other embodiments, graphical representations generated by the display control component described herein may visually indicate, for one or more outbound shipments, the state of an outgoing shipment loading process in which the shipment resides. For example, in various embodiments states of an outgoing shipment loading process in which a particular shipment may reside may include one or more of a pre-picking state, a scheduled for picking state, a picked state, a pending sortation state, a sorted state, a packed state, a shipped state, and a loaded state. While the following description describes such states with respect to a given shipment, the same states can easily be applied in a similar fashion to a single item. In the pre-picking state of the outgoing shipment loading process, the given shipment has yet to be scheduled for picking (e.g., picking 40 described above). For instance, items of the given shipment may be sitting as stock storage in inventory 30. In the scheduled for picking state, the given shipment is scheduled to be picked but items of the shipment have not yet been picked from inventory. For example, a shipment may be scheduled to be picked subsequent to a customer ordering the items that make up the shipment. In the picked state (also referred to as an actively picking state), at least one item of the shipment has been picked from inventory. For instance, an agent, such as illustrated in FIG. 2, may have picked the item from inventory to be sorted or packed. At this point in the outgoing shipment loading process, shipment may enter a pending sortation state where items of the order wait to be sorted. Once sorting has completed, the shipment enters the sorted state (note that if the shipment only includes one item, it may bypass sorting and proceed directly to packing). For instance, the items of the shipment may have been sorted, such as described above with respect to sorting 50. After the items of the shipment have been sorted appropriately, the shipment may enter a sorted or pending packing state where the shipment waits to be packed for shipment. Once a shipping label is applied to the shipment (and/or the control system registers the given shipment as being shipped), the shipment may enter the shipped state. The final state of the outgoing shipment loading process includes the loaded state in which the items of the shipment are loaded on to an outbound vehicle. Any of the above described states may be tracked for given shipments by the display control component and displayed as part of the various graphical representation described above.

Figure 6:
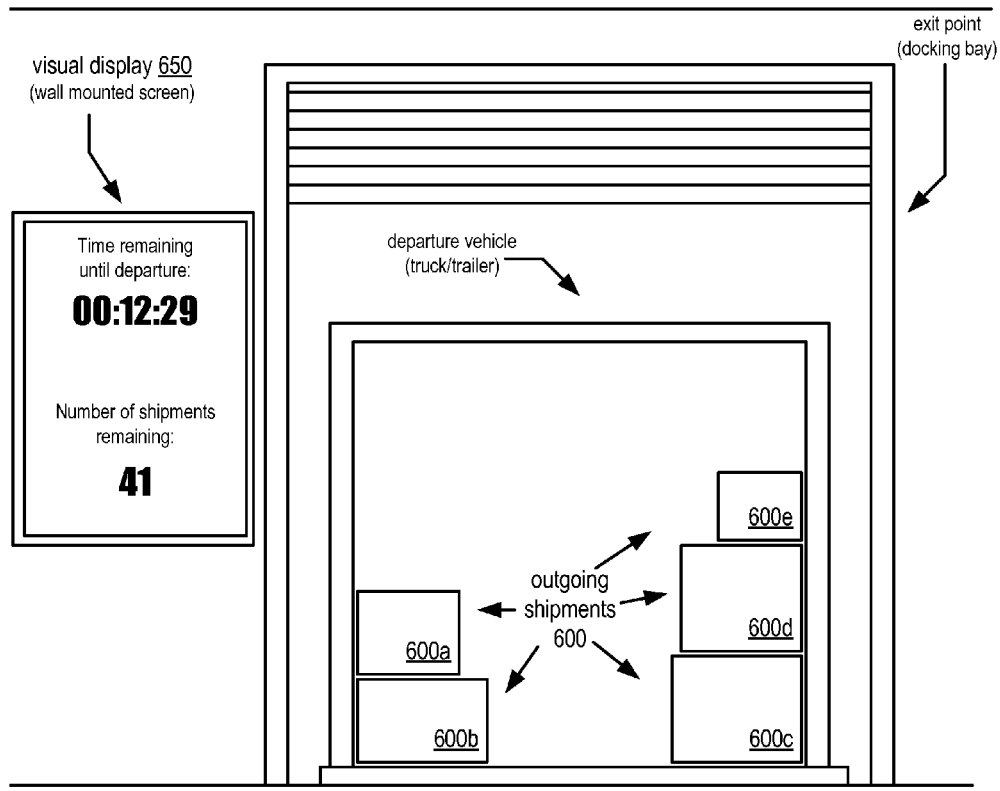
FIG. 6 illustrates an example exit point of a materials handling facility and an associated visual display.

In some embodiments, in addition to generating a graphical representation of the above describe information, the display control component (and/or the control system) may be configured to determine the cost of upgrading an entire load of outbound shipments (which might be necessary if the load is not prepared by the required time) and or the cost of concessions to the customers that ordered the shipments of the particular load (which might also be necessary if the load is not prepared by the required time). Such information may be display as a graphical representation on a visual display, such as the visual display of FIG. 6.

Note that in various embodiments, the information described as accessible via the generated graphical representations may be available on devices other than the above described visual displays. For instance, in some embodiments, management consoles may be placed throughout the fulfillment center and anyone with the appropriate credentials may access information generated by the display control component, even if such information is not currently visible on any visual display within the materials handling facility.

Figure 7:
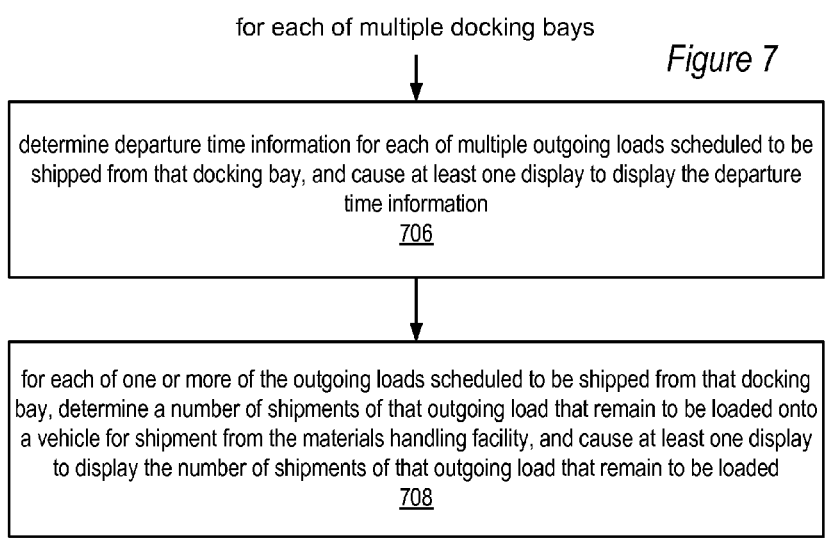
FIG. 7 illustrates a flowchart of an example method for generating a graphical representation for outbound shipping loads.

FIG. 7 illustrates a flowchart of an example method for generating a graphical representation of load information for outbound shipments. In various embodiments, the method described herein (as well as the various other methods described) may be implemented by the display control component and/or control system described herein. As illustrated, blocks 706 and 708 may be performed for each multiple docking bays of the materials handling facility. As illustrated by block 706, the method may include, determining departure time information for each of multiple outgoing loads scheduled to be shipped from that docking bay, and cause at least one display to display the departure time information. For instance, visual display 650 illustrates such a display including departure time information. Departure time information may include, e.g., a measure of the amount of time until a given load is scheduled to disembark from the materials handling facility. In other cases, departure time information may include an exact or estimated time at which the given load is scheduled or expected to leave the materials handling facility. For instance, such departure time information may include a time specified by a shipping carrier. For example, such specified time may include a time past which loads can no longer be accepted by the carrier for a given day.

As illustrated by block 708, the method may further include, for each of one or more of the outgoing loads scheduled to be shipped from that docking bay, determining a number of shipments of that outgoing load that remain to be loaded onto a vehicle for shipment from the materials handling facility, and cause at least one display to display the number of shipments of that outgoing load that remain to be loaded. For example, visual display 650 illustrates such a visual indication. In some embodiments, the method may include tracking the number of shipments en route (e.g., via a conveyance mechanism, such as a conveyor belt) to a given docking bay and displaying such number as part of a display, such as display 650. For instance, the method may include determining shipments processed by a packing process (e.g., packing 60) that have yet to arrive at a given docking bay and displaying such information via one or more displays in the materials handling facility. In this way, agents viewing such displays may gain greater visibility into the amount of work required at a given docking bay (and by extension the amount of labor resources required for such docking bay). In various other embodiments, the method may also include displaying the state of an outgoing shipment loading process (described above) in which one or more of the shipments (of the given load) reside. For instance, in some embodiments, the method may include providing, via the one or more displays, a visual indication of how many shipments are in each of one or more of the various states described above with respect to the outgoing shipment loading process (e.g., pre-picking, sorting, shipping, etc.). In various embodiments, causing any of the above described information to be displayed on one or more displays in the materials handling facility may include sending a corresponding instruction or other command to one or more displays in order to cause the displays to display such information.

Exemplary System

Figure 8:
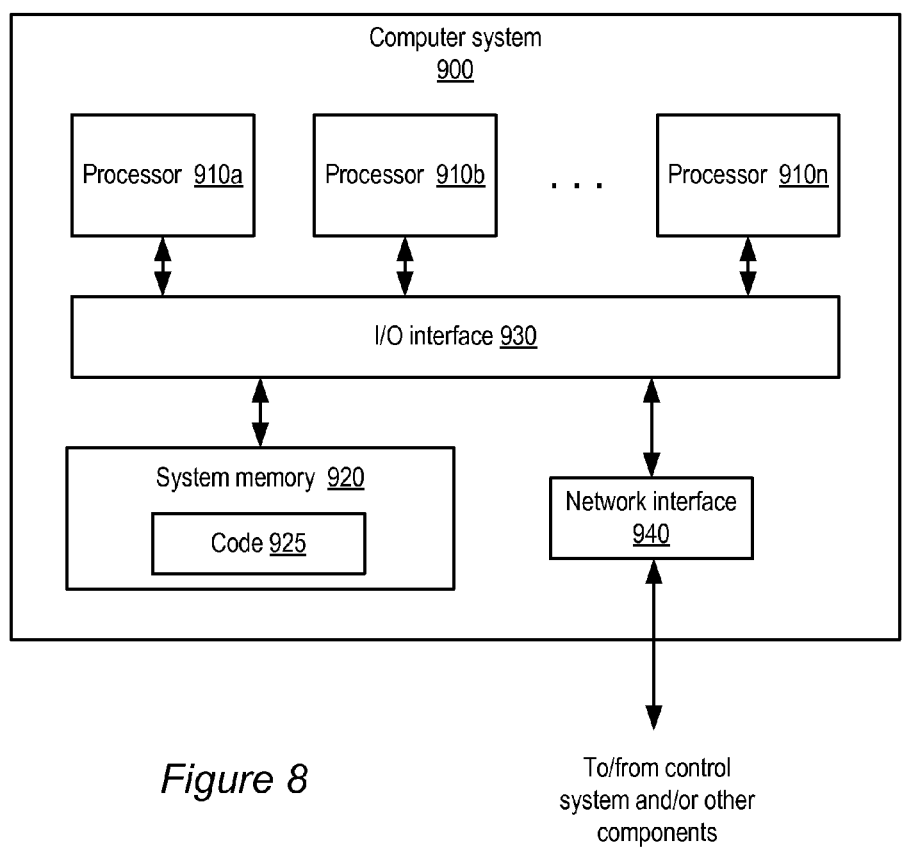
FIG. 8 is a block diagram illustrating an exemplary embodiment of a computer system.

In one embodiment, a system that implements one or more components of a system and method for generating a visual display indicating the status of multiple shipping loads as described herein may include a general-purpose computer system that includes or is configured to access one or more computer-accessible media, such as computer system 900 illustrated in FIG. 8. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a control system 190 and/or a display control component of a system and method for generating a visual display indicating the status of multiple shipping loads, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 800, such as other computer systems, communications devices, control mechanisms, readers, scanners and so on that are components of the system and method for generating a visual display indicating the status of multiple shipping loads. The communications channels may include, but are not limited to conventional and mobile telephone and text messaging communications channels. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 9 for implementing a control system for, or possibly other components of a system and method for generating a visual display indicating the status of multiple shipping loads. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that embodiments embrace all such modifications and changes and, accordingly, the above description to be regarded in an illustrative rather than a restrictive sense.

What is claimed is:

1. A materials handling facility, comprising:
a plurality of docking bays, each docking bay including an entrance of the materials handling facility for receiving incoming loads;
a plurality of displays, wherein each display is visible within the materials handling facility from at least one of the plurality of docking bays; and
a control system configured to:
for each of the plurality of docking bays, determine arrival time information for each of a plurality of incoming loads that are en route to the materials handling facility and scheduled to arrive at that docking bay, and cause at least one of the plurality of displays to display the arrival time information to indicate when the incoming loads are expected to arrive at the materials handling facility;
for each of the plurality of docking bays, determine a load arrival process status for each of the plurality of incoming loads that are en route to the materials handling facility and scheduled to arrive at that docking bay, and cause at least one of the plurality of displays to display the load arrival process status;
for each incoming load that has arrived at one of the plurality of docking bays, determine a receiving process status of a receiving process for receiving items into inventory in the materials handling facility, and cause at least one of the plurality of displays to display the receiving process status;
based on a time at which a given load of items arrives at the materials handling facility, and a requirement that specifies the items of the given load are to be stored within an inventory storage area of the materials handling facility and ready for fulfillment of a customer order no later than a specified period of time after the load arrives at the materials handling facility: determine a quantity of time remaining until the load is expected to be stored within the inventory storage area of the materials handling facility and ready for fulfillment of a customer order; and
generate within at least one of the plurality of displays, a visual indication of the determined quantity of time remaining until the load is expected to be stored within the inventory storage area of the materials handling facility and ready for fulfillment of a customer order.

2. The materials handling facility of claim 1, wherein the control system is further configured to, for each of the plurality of incoming loads, determine a number of items contained within that incoming load, and cause at least one of the plurality of displays to display the number of items contained within that incoming load.

3. The materials handling facility of claim 1, wherein the control system is further configured to, for each incoming load that has arrived at one of the plurality of docking bays, determine an actual arrival time for that incoming load, and cause at least one of the plurality of displays to display the actual arrival time.

4. The materials handling facility of claim 1, wherein the control system is further configured to, for each incoming load, determine a carrier responsible for delivering that incoming load to the materials handling facility, and cause at least one of the plurality of displays to display an indication of the carrier.

5. The materials handling facility of claim 1, wherein the control system is further configured to, for each incoming load, determine an identifier for one of the plurality of docking bays at which that incoming load is scheduled to arrive, and cause at least one of the plurality of displays to display the identifier.

6. The materials handling facility of claim 1, wherein for a given one of said plurality of loads, said load arrival process status indicates that the given load:
   has not yet arrived at the materials handling facility;
   has arrived at one of the plurality of docking bays;
   is queued at the materials handling facility for arrival;
   has arrived at the premises of the materials handling facility and is en route to one of the plurality of docking bays;
   has arrived at one of the plurality of docking bays and is being unloaded; or
   has arrived at one of the plurality of docking bays and items from the given load are being stowed within the materials handling facility.

7. The materials handling facility of claim 1, wherein the control system is further configured to, for each incoming load, determine one or more particular product groups to which one or more items of the incoming load belong, and cause at least one of the plurality of displays to display the determined one or more particular product groups.

8. The materials handling facility of claim 1, wherein the control system is further configured to, for each incoming load, determine one or more unloading requirements for unloading one or more items of said incoming load, and cause at least one of the plurality of displays to display the determined one or more unloading requirements.

9. The materials handling facility of claim 1, wherein for a given one of said plurality of loads, said receiving process status indicates:
   a count of items in a given incoming load that have been unloaded;
   a count of items of a given incoming load that have been stowed in the materials handling facility; or
   an amount of time left to complete processing of a given incoming load.

10. The materials handling facility of claim 1, further comprising a plurality of docking bays for shipping a plurality of outgoing loads; wherein the control system is further configured to, for each of the plurality of docking bays:
   determine departure time information for each of a plurality of outgoing loads scheduled to be shipped from that docking bay, and cause at least one of the plurality of displays to display the departure time information, wherein each of said outgoing loads comprises one or more shipments;
   for each of one or more of said outgoing loads scheduled to be shipped from that docking bay, determine a number of shipments of that outgoing load that remain to be loaded onto a vehicle for shipment from the materials handling facility, and cause at least one of the plurality of displays to display the number of number of shipments of that outgoing load that remain to be loaded.

11. A materials handling facility, comprising:
   a plurality of docking bays for shipping a plurality of outgoing loads from the materials handling facility;
   a plurality of displays, wherein each display is visible within the materials handling facility from at least one of the plurality of docking bays; and
   a control system configured to, for each of the plurality of docking bays:
      determine departure time information for each of a plurality of outgoing loads scheduled to be shipped from that docking bay, the departure time information indicating a quantity of time remaining until the respective outgoing load is scheduled to depart from the materials handling facility; and cause at least one of the plurality of displays to display the departure time information, wherein each of said outgoing loads comprises one or more shipments;
      for each of one or more of said outgoing loads scheduled to be shipped from that docking bay, determine a number of shipments of that outgoing load that remain to be loaded onto a vehicle for shipment from the materials handling facility, and cause at least one of the plurality of displays to display the number of shipments of that outgoing load that remain to be loaded onto said vehicle together with the respective departure time information for that outgoing load; and
      determine a cost of failing to load the shipments of a given outgoing load of that docking bay onto said vehicle before expiration of the determined quantity of time, and cause at least one of the plurality of displays to display said cost together with the determined quantity of time and said number of shipments of that outgoing load that remain to be loaded onto said vehicle.

12. The materials handling facility of claim 11, wherein said control system is further configured to, for each of the plurality of docking bays, determine an outgoing shipment loading process status for a given outgoing load scheduled to be shipped from that docking bay, and cause at least one of the plurality of displays to display said outgoing shipment loading process status.

13. The materials handling facility of claim 12, wherein said outgoing shipment loading process status indicates that one or more shipments of the given outgoing load:
   have not been scheduled to be picked from inventory;
   have been scheduled to be picked from inventory;
   have been picked from inventory;
   have been sorted;
   have been assigned a shipping label; or
   have been loaded onto said vehicle for departure from the materials handling facility.

14. A computer-implemented method, comprising:
   performing by one or more computers:

for each of a plurality of docking bays that each include an entrance of a materials handling facility for receiving incoming loads, determining arrival time information for each of a plurality of incoming loads that are en route to the materials handling facility and scheduled to arrive at that docking bay, and causing at least one of a plurality of displays to display the arrival time information to indicate when the incoming loads are expected to arrive at the materials handling facility, wherein each display is visible within a materials handling facility from at least one of the plurality of docking bays;

for each of the plurality of docking bays, determining a load arrival process status for each of the plurality of incoming loads that are en route to the materials handling facility and scheduled to arrive at that docking bay, and causing at least one of the plurality of displays to display the load arrival process status;

for each incoming load that has arrived at one of the plurality of docking bays, determining a receiving process status of a receiving process for receiving items into inventory in the materials handling facility, and causing at least one of the plurality of displays to display the receiving process status;

based on a time at which a given load of items arrives at the materials handling facility, and a requirement that specifies the items of the given load are to be stored within an inventory storage area of the materials handling facility and ready for fulfillment of a customer order no later than a specified period of time after the load arrives at the materials handling facility: determining a quantity of time remaining until the load is expected to be stored within the inventory storage area of the materials handling facility and ready for fulfillment of a customer order; and generating within at least one of the plurality of displays, a visual indication of the determined quantity of time remaining until the load is expected to be stored within the inventory storage area of the materials handling facility and ready for fulfillment of a customer order.

15. The method of claim 14, further comprising, for each of the plurality of incoming loads, determining a number of items contained within that incoming load, and causing at least one of the plurality of displays to display the number of items contained within that incoming load.

16. The method of claim 14, further comprising, for each incoming load that has arrived at one of the plurality of docking bays, determining an actual arrival time for that incoming load, and causing at least one of the plurality of displays to display the actual arrival time.

17. The method of claim 14, further comprising, for each incoming load, determining a carrier responsible for delivering that incoming load to the materials handling facility, and causing at least one of the plurality of displays to display an indication of the carrier.

18. The method of claim 14, further comprising, for each incoming load, determining an identifier for one of the plurality of docking bays at which that incoming load is scheduled to arrive, and causing at least one of the plurality of displays to display the identifier.

19. The method of claim 14, wherein for a given one of said plurality of loads, said load arrival process status indicates that the given load:
has not yet arrived at the materials handling facility;
has arrived at one of the plurality of docking bays;
is queued at the materials handling facility for arrival;
has arrived at the premises of the materials handling facility and is en route to one of the plurality of docking bays;
has arrived at one of the plurality of docking bays and is being unloaded; or
has arrived at one of the plurality of docking bays and items from the given load are being stowed within the materials handling facility.

20. The method of claim 14, further comprising, for each incoming load, determining one or more particular product groups to which one or more items of the incoming load belong, and causing at least one of the plurality of displays to display the determined one or more particular product groups.

21. The method of claim 14, further comprising, for each incoming load, determining one or more unloading requirements for unloading one or more items of said incoming load, and causing at least one of the plurality of displays to display the determined one or more unloading requirements.

22. The method of claim 14, wherein for a given one of said plurality of loads, said receiving process status indicates:
a count of items in a given incoming load that have been unloaded;
a count of items of a given incoming load that have been stowed in the materials handling facility; or
an amount of time left to complete processing of a given incoming load.

23. The method of claim 14, further comprising, for each of a plurality of docking bays configured for shipping a plurality of outgoing loads:
determining departure time information for each of a plurality of outgoing loads scheduled to be shipped from that docking bay, and causing at least one of the plurality of displays to display the departure time information, wherein each of said outgoing loads comprises one or more shipments;
for each of one or more of said outgoing loads scheduled to be shipped from that docking bay, determining a number of shipments of that outgoing load that remain to be loaded onto a vehicle for shipment from the materials handling facility, and causing at least one of the plurality of displays to display the number of number of shipments of that outgoing load that remain to be loaded.

24. A computer-implemented method, comprising:
performing by one or more computers:
for each of a plurality of docking bays configured for shipping a plurality of outgoing loads from a materials handling facility:
determining departure time information for each of a plurality of outgoing loads scheduled to be shipped from that docking bay, the departure time information indicating a quantity of time remaining until the respective outgoing load is scheduled to depart from the materials handling facility; and causing at least one of a plurality of displays to display the departure time information, wherein each of said outgoing loads comprises one or more shipments, wherein each of said plurality of displays is visible within the materials handling facility from at least one of the plurality of docking bays;
for each of one or more of said outgoing loads scheduled to be shipped from that docking bay, determining a number of shipments of that outgoing load that remain to be loaded onto a vehicle for shipment from the materials handling facility, and causing at least one of the plurality of displays to display the number of shipments of that outgoing load that remain to be loaded onto said vehicle together with the respective departure time information for that outgoing load; and determining a cost of failing to load the shipments of a given outgoing load of that docking bay onto said vehicle before expiration of the determined quantity of time, and causing at least one of the plurality of displays to display said cost together with the determined quantity of time and said number of shipments of that outgoing load that remain to be loaded onto said vehicle.

25. The method of claim 24, wherein the method comprises, for each of the plurality of docking bays, determining an outgoing shipment loading process status for a given outgoing load scheduled to be shipped from that docking bay, and causing at least one of the plurality of displays to display said outgoing shipment loading process status.

26. The method of claim 25, wherein said outgoing shipment loading process status indicates that one or more shipments of the given outgoing load:
   have not been scheduled to be picked from inventory;
   have been scheduled to be picked from inventory;
   have been picked from inventory;
   have been sorted;
   have been assigned a shipping label; or
   have been loaded onto said vehicle for departure from the materials handling facility.

27. A non-transitory computer-readable storage medium, comprising program instructions computer-executable to:
   for each of a plurality of docking bays that each include an entrance of a materials handling facility for receiving incoming loads, determine arrival time information for each of a plurality of incoming loads that are en route to the materials handling facility and scheduled to arrive at that docking bay, and cause at least one of a plurality of displays to display the arrival time information to indicate when the incoming loads are expected to arrive at the materials handling facility, wherein each display is visible within a materials handling facility from at least one of the plurality of docking bays;
   for each of the plurality of docking bays, determine a load arrival process status for each of the plurality of incoming loads that are en route to the materials handling facility and scheduled to arrive at that docking bay, and cause at least one of the plurality of displays to display the load arrival process status;
   for each incoming load that has arrived at one of the plurality of docking bays, determine a receiving process status of a receiving process for receiving items into inventory in the materials handling facility, and cause at least one of the plurality of displays to display the receiving process status;
   based on a time at which a given load of items arrives at the materials handling facility, and a requirement that specifies the items of the given load are to be stored within an inventory storage area of the materials handling facility and ready for fulfillment of a customer order no later than a specified period of time after the load arrives at the materials handling facility: determine a quantity of time remaining until the load is expected to be stored within the inventory storage area of the materials handling facility and ready for fulfillment of a customer order; and
   generate within at least one of the plurality of displays, a visual indication of the determined quantity of time remaining until the load is expected to be stored within the inventory storage area of the materials handling facility and ready for fulfillment of a customer order.

28. The medium of claim 27, wherein the program instructions are computer-executable to, for each of the plurality of incoming loads, determine a number of items contained within that incoming load, and cause at least one of the plurality of displays to display the number of items contained within that incoming load.

29. The medium of claim 27, wherein the program instructions are computer-executable to, for each incoming load that has arrived at one of the plurality of docking bays, determine an actual arrival time for that incoming load, and cause at least one of the plurality of displays to display the actual arrival time.

30. The medium of claim 27, wherein the program instructions are computer-executable to, for each incoming load, determine a carrier responsible for delivering that incoming load to the materials handling facility, and cause at least one of the plurality of displays to display an indication of the carrier.

31. The medium of claim 27, wherein the program instructions are computer-executable to, for each incoming load, determine an identifier for one of the plurality of docking bays at which that incoming load is scheduled to arrive, and cause at least one of the plurality of displays to display the identifier.

32. The medium of claim 27, wherein for a given one of said plurality of loads, said load arrival process status indicates that the given load:
   has not yet arrived at the materials handling facility;
   has arrived at one of the plurality of docking bays;
   is queued at the materials handling facility for arrival;
   has arrived at the premises of the materials handling facility and is en route to one of the plurality of docking bays;
   has arrived at one of the plurality of docking bays and is being unloaded; or
   has arrived at one of the plurality of docking bays and items from the given load are being stowed within the materials handling facility.

33. The medium of claim 27, wherein the program instructions are computer-executable to, for each incoming load, determine one or more particular product groups to which one or more items of the incoming load belong, and cause at least one of the plurality of displays to display the determined one or more particular product groups.

34. The medium of claim 27, wherein the program instructions are computer-executable to, for each incoming load, determine one or more unloading requirements for unloading one or more items of said incoming load, and cause at least one of the plurality of displays to display the determined one or more unloading requirements.

35. The medium of claim 27, wherein for a given one of said plurality of loads, said receiving process status indicates:
   a count of items in a given incoming load that have been unloaded;
   a count of items of a given incoming load that have been stowed in the materials handling facility; or
   an amount of time left to complete processing of a given incoming load.

36. The medium of claim 27, wherein the program instructions are computer-executable to, for each of a plurality of docking bays configured for shipping a plurality of outgoing loads:
   determine departure time information for each of a plurality of outgoing loads scheduled to be shipped from that docking bay, and cause at least one of the plurality of displays to display the departure time information, wherein each of said outgoing loads comprises one or more shipments;

for each of one or more of said outgoing loads scheduled to be shipped from that docking bay, determine a number of shipments of that outgoing load that remain to be loaded onto a vehicle for shipment from the materials handling facility, and cause at least one of the plurality of displays to display the number of number of shipments of that outgoing load that remain to be loaded.

37. A non-transitory computer-readable storage medium, comprising program instructions computer-executable to:
for each of a plurality of docking bays configured for shipping a plurality of outgoing loads from a materials handling facility:
determine departure time information for each of a plurality of outgoing loads scheduled to be shipped from that docking bay, the departure time information indicating a quantity of time remaining until the respective outgoing load is scheduled to depart from the materials handling facility; and cause at least one of a plurality of displays to display the departure time information, wherein each of said outgoing loads comprises one or more shipments, wherein each of said plurality of displays is visible within the materials handling facility from at least one of the plurality of docking bays;
for each of one or more of said outgoing loads scheduled to be shipped from that docking bay, determine a number of shipments of that outgoing load that remain to be loaded onto a vehicle for shipment from the materials handling facility, and cause at least one of the plurality of displays to display the number of shipments of that outgoing load that remain to be loaded onto said vehicle together with the respective departure time information for that outgoing load; and
determine a cost of failing to load the shipments of a given outgoing load of that docking bay onto said vehicle before expiration of the determined quantity of time, and cause at least one of the plurality of displays to display said cost together with the determined quantity of time and said number of shipments of that outgoing load that remain to be loaded onto said vehicle.

38. The medium of claim 37, wherein the program instructions are computer-executable to, for each of the plurality of docking bays, determine an outgoing shipment loading process status for a given outgoing load scheduled to be shipped from that docking bay, and cause at least one of the plurality of displays to display said outgoing shipment loading process status.

39. The medium of claim 38, wherein said outgoing shipment loading process status indicates that one or more shipments of the given outgoing load:
have not been scheduled to be picked from inventory;
have been scheduled to be picked from inventory;
have been picked from inventory;
have been sorted;
have been assigned a shipping label; or
have been loaded onto said vehicle for departure from the materials handling facility.

* * * * *